United States Patent
Alba (10) Patent No.: US 7,114,872 B2
(45) Date of Patent: Oct. 3, 2006

(54) WRENCHLESS HOIST RING MOUNTING

(75) Inventor: Tony J. Alba, West Covina, CA (US)

(73) Assignee: CBC Industries, Inc., Pico Rivera, CA (US)

( * ) Notice: Subject to any disclaimer, the term of this patent is extended or adjusted under 35 U.S.C. 154(b) by 0 days.

(21) Appl. No.: 10/119,579

(22) Filed: Apr. 9, 2002

(65) Prior Publication Data

US 2002/0164198 A1 Nov. 7, 2002

Related U.S. Application Data (60) Provisional application No. 60/283,088, filed on Apr. 11, 2001.

(51) Int. Cl.
  *F16D 1/12* (2006.01)
  *A47F 13/06* (2006.01)
(52) U.S. Cl. .......................... 403/78; 403/165; 294/1.1
(58) Field of Classification Search ................ 403/78, 403/79, 119, 165, 164, 71; 294/1.1, 67.1, 294/82.1, 82.15, 89; 410/101, 104, 111; 248/499
See application file for complete search history.

(56) References Cited

U.S. PATENT DOCUMENTS

| | | | |
|---|---|---|---|
| 3,656,797 A * | 4/1972 | Ratcliff | ........................ 294/82.1 |
| 3,687,182 A * | 8/1972 | Grimm | |
| 3,905,633 A | 9/1975 | Larson | |
| 4,304,432 A | 12/1981 | Silva | |
| 4,431,352 A | 2/1984 | Andrews | |
| 4,592,686 A | 6/1986 | Andrews | |
| 4,641,986 A | 2/1987 | Tsui et al. | |
| 4,705,422 A | 11/1987 | Tsui et al. | |
| 4,941,698 A | 7/1990 | Kilbert et al. | |
| 4,974,992 A | 12/1990 | Harter | |
| 5,052,869 A | 10/1991 | Hansen, II | |
| 5,286,130 A | 2/1994 | Mueller | |
| 5,405,210 A | 4/1995 | Tsui et al. | |
| 5,580,110 A | 12/1996 | Lecourt | |
| 5,586,801 A | 12/1996 | Sawyer et al. | |
| 5,634,734 A * | 6/1997 | Schron et al. | ................. 403/78 |
| 5,713,695 A | 2/1998 | Rogers | |
| 5,775,664 A | 7/1998 | Martin | |
| 5,823,588 A | 10/1998 | Morghen | |
| 5,848,815 A | 12/1998 | Tsui et al. | |
| 5,927,780 A | 7/1999 | Chandler | |
| 5,979,954 A | 11/1999 | Tsui et al. | |

(Continued)

*Primary Examiner*—Daniel P. Stodola
*Assistant Examiner*—Victor MacArthur
(74) *Attorney, Agent, or Firm*—Bruce A. Jagger (57) ABSTRACT

An omni-positional hoist ring wherein a shackle member is pivotally attached to a rotationally mounted lift body, the lift body is rotationally mounted on a flanged bushing, and the flanged bushing is mounted on a screw. Torque is applied to the screw by applying force to one or more axially projecting lugs. The lugs may be positioned on a collar that surrounds and is keyed to a mounting stud, or to a bar nut that is located on the distal end of mounting stud. A boss may be provided surrounding the axial bore of the collar. The purpose of the boss is to space the lifting fixture away from the axially projecting lugs on the radially outer periphery of the collar. When the axially extending lugs are on the outer periphery of a collar, torque is conveniently applied by striking the upstanding lugs with, for example, a hammer. Lugs on a bar nut a conveniently positioned to receive torque from a bar that is projected laterally between the lugs.

7 Claims, 5 Drawing Sheets

U.S. PATENT DOCUMENTS

| | | |
|---|---|---|
| 6,022,164 A | 2/2000 | Tsui et al. |
| 6,039,500 A | 3/2000 | Kwon |
| 6,068,310 A | 5/2000 | Fuller et al. |
| 6,161,883 A | 12/2000 | Pearl |
| 6,199,925 B1 | 3/2001 | Alba |

* cited by examiner

WRENCHLESS HOIST RING MOUNTING

RELATED APPLICATIONS

This Application claims the benefit of Provisional Application No. 60/283,088, filed Apr. 11, 2001.

BACKGROUND OF THE INVENTION

1. Field of the Invention

The invention relates in general to omni-positional hoist rings and other lifting fixtures, and, in particular, to hubs and nuts for the wrenchless mounting of omni-positional lifting fixtures to a substrate, and that are particularly suited for use under circumstances where lifting fixtures are to be mounted to trench plates.

2. Description of the Prior Art

Safety hoist rings of various that are capable of pivoting through an arc of 180 degrees and of swiveling through a full 360 degrees are well known and widely used. The shackles or U-bars in such devices are capable of moving so as to be aligned exactly with the direction of a tensile load applied from anywhere within a hemisphere that is disposed about the hoist ring assembly. Such safety hoist rings that comprise omni-positional lifting fixtures include, for example, Tsui et al. U.S. Pat No. 4,641,986 (a threaded central stud is surrounded by a flanged bushing that bears on the surface of a load, a collar that is slightly shorter than the bushing rotatably surrounds the cylindrical body of the bushing, the enlarged bulbous opposed ends of a U-bar or shackle are turned into opposed axial alignment with one another and are pivotally captured in cavities defined between the flange of the bushing and the collar); Tsui et al. U.S. Pat. No. 4,705,422 (a threaded central stud is surrounded by a flanged bushing that bears on the surface of a load, a collar that is slightly shorter than the cylindrical body of the bushing rotatably surrounds the cylindrical distal portion of the bushing, the opposed ends of a U-bar or shackle are pivotally pinned to the collar, and the axially aligned pins are held in the collar by clips on the radially inner ends thereof); Tsui U.S. Pat. No. 5,405,210 (a threaded central stud is surrounded by a flanged bushing that bears on the surface of a load, a collar that is slightly shorter than the cylindrical body of the bushing rotatably surrounds the cylindrical distal end of the bushing, the radially flattened enlarged opposed ends of a U-bar are turned into opposed axial alignment with one another and are pivotally captured between the collar and the flange of the bushing); Tsui et al. U.S. Pat. No. 5,848,815 (a threaded central stud is surrounded by a flanged bushing that bears on the surface of a load, a collar that is slightly shorter than the cylindrical body of the bushing rotatably surrounds the cylindrical body of the bushing, the opposed ends of a U-bar or shackle are pivotally pinned to the collar, and the axially aligned pins are held in the collar by retainer pins that are driven through the collar and into the radially inner ends of the pins); Tsui et al. U.S. Pat. No. 5,979,954 (a shackle is pivotally pinned to the distal end of a lift stud by means of a clevis pin, an externally threaded headed bushing is adapted to being threadably inserted into a bore in a load to bear against the surface of the load, the cylindrical proximal end of the lift stud is rotatably received in the bushing and retained there without binding with the bushing by a threaded cylindrical nut mounted to the proximal end of the lift stud that protrudes through the bushing, and the external diameter of the cylindrical nut is larger than the internal diameter of the bushing and smaller than the external diameter of the bushing so as to pass through the threaded bore in which the bushing is mounted, yet retain the proximal end of the lift stud within the bushing); Tsui et al. U.S. Pat. No. 6,022,164 (The enlarged distal end of a threaded stud defines a cavity that opens axially away from the stud, an enlarged proximal end of a hoist head is rotatably trapped in the cavity and the distal end of the hoist head is pivotally connected to a shackle through a clevis pin); and Alba U.S. Pat. No. 6,199,925 (a hoist ring in which very high tensile loads on the mounting shank are achieved by the use of a plurality of tensioning bolts).

Other hoist rings that comprise omni-positional lifting fixtures include, for example, Larson U.S. Pat. No. 3,905,633 (the trunions for mounting a U-bar are integral with a lift body that is rotatably mounted through a pair of hat shaped retainer plates to a threaded center stud); Andrews U.S. Pat. No. 4,431,352 (similar to Andrews U.S. Pat. No. 4,592,686 except that the bushing is frustoconical in shape); Andrews U.S. Pat. No. 4,592,686 (pivot axles for a U-bar are inserted into and pinned to a lift body that is rotatably mounted through a flanged bushing to a threaded center stud); Seidel U.S. Pat. No. 4,699,410 (a D-ring is pivotally trapped in a two-piece lifting body which is in turn rotatably trapped within a cavity in an external housing for rotation about a threaded center stud); Hansen II U.S. Pat. No. 5,052,869 (an omni-positional tie down structure, which is representative of lightly constructed tie down devices that are intended to be pre-assembled and mounted to the body of a carrier to provide an attachment point for cargo lashings); Mueller U.S. Pat. No. 5,286,130 (a lift body having a shackle pivotally pinned by a clevis pin to its distal end, and the cylindrical head of a screw rotatably trapped entirely within an axially facing cavity in the proximal end of the lift body, where a threaded port extends laterally through one side of the proximal end of the lift body into the cavity to enable the temporary locking of the lift body to the screw so that the screw can be tightened into a threaded bore in a load by rotating the lift body); Lecourt U.S. Pat. No. 5,580,110 (a lift body with axially opposed trunions is rotatably and permanently mounted about a threaded center stud, the opposed ends of a shackle are pivotally mounted on the trunions by means of an undisclosed procedure); Sawyer U.S. Pat. No. 5,586,801 (similar to Tsui et al. U.S. Pat. No. 4,705,422, except the center stud is welded to the load); Schron, Jr. et al. U.S. Pat. No. 5,634,734 (a D-ring is pivotally trapped in a two-piece lifting body, which is in turn rotatably mounted on a threaded center stud, and the lifting body is laterally pierced to allow access to rotatably tighten the threaded center stud); Martin U.S. Pat. No. 5,775,664 (the enlarged end of a mushroom shaped lift body is rotatably trapped in a cavity in a plate, the plate is bolted to a load, and a lifting ring is mounted in a cross-bore in the exposed end of the lift body); Morghen U.S. Pat. No. 5,823,588 (the enlarged circular head at the proximal end of a mushroom shaped lift swivel is rotatably trapped within a cavity in a mounting plate, the opposed ends of a shackle are pivotally mounted on a bolt that extends transversely through the distal end of the lift swivel, and the mounting plate is secured directly or indirectly to the load); Chandler U.S. Pat. No. 5,927,780 (is similar to Andrews U.S. Pat. No. 4,592,686 except that the shackle is generally H-shaped to accommodate attachment to a flat web); Kwon U.S. Pat. No. 6,039,500 (a side pull hoist ring wherein a shackle is mounted through a clevis pin to a lift body, the lift body is mounted for quick detachment to a load, but the hoist ring will not safely support loads applied from any direction, that is, this is not an omni-positional lifting fixture. Detachment is accomplished by lateral movement of the lift body, and a light elongated tongue member is employed to retain the lift body in the mounted configuration. The application of a substantial load parallel to the axis of the mounting screw would bend the elongated tongue and pull the lifting body away from the load.); Fuller et al. U.S. Pat. No. 6,068,310 (a D-ring is pivotally received in the throat of a clevis, and a center stud is rotatably received in the opposed ends of the clevis so that the pivot axis of the D-ring is offset from the rotational axis of the clevis); Pearl U.S. Pat. No. 6,161,883 (a hoist ring with a U-bar pivotally pinned to a lift body that is rotatably mounted to a flanged bushing, and with a large diameter skirt member coupled to a bi-threaded center stud that is threaded into a trench plate).

Typically, such previous omni-positional lifting fixtures comprised a shackle or U-bar that was pivotally connected to a rotationally mounted member such that the desired omni-positional pivoting and swiveling was achieved. The prior omni-positional lifting fixtures included a retainer that attached the fixture to a load so that some part of the fixture engaged with and bore firmly against the load. The retainer could be part of (see Tsui et al. U.S. Pat. No. 5,979,954) or separate from (see Tsui U.S. Pat. No. 5,405,210) the rotationally mounted member. Usually, but not always, (see Morghen U.S. Pat. No. 5,823,588, particularly FIG. 8, and Martin U.S. Pat. No. 5,775,664) the rotationally mounted member was mounted for rotation about the longitudinal axis of the retainer, that is, the rotationally mounted member generally rotated about the longitudinal axis of a screw or stud that was attached to the load. Usually, but not always, (see Fuller et al. U.S. Pat. No. 6,068,310) the pivotal axis intersected with the rotational axis. Often, but not always, (see Sawyer et al. U.S. Pat. No. 5,586,801) the retainer was threaded, and screwed into a mating threaded hole in the load. The shackle or U-bar was generally configured to accept the lifting member with which it was expected to be used (see, for example, Chandler U.S. Pat. No. 5,927,780, Tsui et al. U.S. Pat. No. 4,641,986, and Kwon US Des. 417,328).

Typically, omni-positional lifting fixtures are drawn very tightly against the substrate by the retainer so that the weight of the load that is lifted is distributed over the footprint of the lifting fixture on the substrate. Regardless of the mounting type, any misalignment between the lifting fixture and the substrate generally creates a substantial safety risk, because in such a circumstance the load is born primarily by the retainer rather than the portion of the fixture that bears against the substrate. It requires a certain amount of skill and equipment to drill and, if necessary, tap a hole so that it is square with the surface of the substrate. Such skill and equipment are not always available at the site where a safety hoist ring is to be attached to a load, particularly in the construction arts. Also, in many circumstances the reverse side of the load is not accessible, so a fastening element can not be applied to the retainer on the reverse side of the load.

Trench plates, vault covers, and the like, are widely used at construction sites to temporarily cover open excavations, and in completed underground construction projects. Trench plates, and the like, are typically large flat steel plates that weigh upwards of 5,000 to 10,000 pounds each. The handling of plates presents many difficulties. Safety is a serious consideration in handling these very heavy plates. Such plates are typically attached to a lifting device, such as a crane, through some suitable coupling. Various expedients have been proposed for such couplings. See, for example, Rogers U.S. Pat. No. 5,713,695 (a square insert for welding into an opening in an excavation cover plate, which insert includes two laterally extending pins for securing the opposed ends of a length of chain to the insert); Harter U.S. Pat. No. 4,974,992 (a excavation cover plate with a lift opening, and a pivotally mounted bail positioned in that lift opening); Silva, U.S. Pat. No. 4,304,432 (a lifting device for use with excavation cover plates wherein the lifting device is releasably locked into a specially configured lifting hole in the plate); and Pearl U.S. Pat. No. 6,161,883 (a hoist ring with a large diameter skirt member coupled to a bi-threaded center stud that is threaded into the trench plate). Inserts for trench plates, which inserts have been precisely bored and tapped to mount lifting devices, have been used in the construction trades for years, particularly by the Department of Water and Power for the City of Los Angeles. Lifting plates with slots configured to allow a chain to pass in one position and not in another have been employed in the lifting arts. See, for example, Kilbert et al. U.S. Pat. No. 4,941,698.

Trench plates are often employed at construction sites where wrenches are not readily available. Pry bars, short lengths of reinforcing bar, and hammers are generally available on such construction sites. Such construction sites pose special challenges to the use of hoist rings and other lifting devices, and particularly to the mounting of such devices on trench plates. The safe usage of hoist rings and other lifting devices requires that they be securely mounted to the load that is to be lifted. This generally means that they are attached to the load by a threaded mount, which is torqued to some large predetermined value. Such torquing generally requires the use of wrenches. Where wrenches are not available workers may attempt to use other expedients, which results in an unsafe installation if the threaded mount is not adequately torqued down. Some torquing means is needed to enable the hoist rings to be safely mounted to a load or other substrate when wrenches are not available. Typically, lifting fixtures are attached to trench plates at the construction site for handling purposes during installation. They are then removed. When the construction is completed, the lifting fixtures are reinstalled and used to remove the trench plates. The lifting fixtures are usually removed again when the trench plates are in storage.

Bar knobs have long been used in the tooling industry. A bar knob is a threaded nut that has spaced apart projections extending generally parallel to the axis of the threaded bore so that a bar can be inserted between them, in a direction generally normal to the axis of the bore, and torque applied. A bar knob generally resembles a castle nut where the axially projecting lugs are widely spaced from one another to receive a pry bar therebetween.

Pearl U.S. Pat. No. 6,161,883 discloses an enlarged star shaped plate mounted on a threaded hoist ring mounting stud. Hammering on the radially extending arms of the star tightens or loosens the threaded mounting stud. The arms rest on the surface of the load.

These and other difficulties of the prior art have been overcome according to the present invention.

BRIEF SUMMARY OF THE INVENTION

A preferred embodiment of the omni-positional lifting fixture according to the present invention comprises an omni-positional lifting fixture for threaded wrenchless assembly to a substrate. The omni-positional lifting fixture comprises a shackle member pivotally attached to a rotationally mounted lift body, and a threaded retainer element that is adapted to threadably attach the omni-positional lifting fixture to a substrate. One or more torque application elements is provided in association with the threaded retainer element. The torque application elements are adapted to permit the application of torque to the threaded retainer element by simple bars and hammers, and without the use of wrenches.

Other objects, advantages, and novel features of the present invention will become apparent from the following detailed description of the invention when considered in conjunction with the accompanying drawings.

BRIEF DESCRIPTION OF THE DRAWINGS

The present invention provides its benefits across a broad spectrum of commerce. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration only and not limitation.

DETAILED DESCRIPTION OF THE PREFERRED EMBODIMENTS

The embodiments shown in FIGS. 1–11 illustrate lifting fixtures wherein torque may be applied to tighten the threaded mounting stud without the use of a wrench. Only hammers or simple bars are employed to tighten or loosen the mounting.

Figure 1:
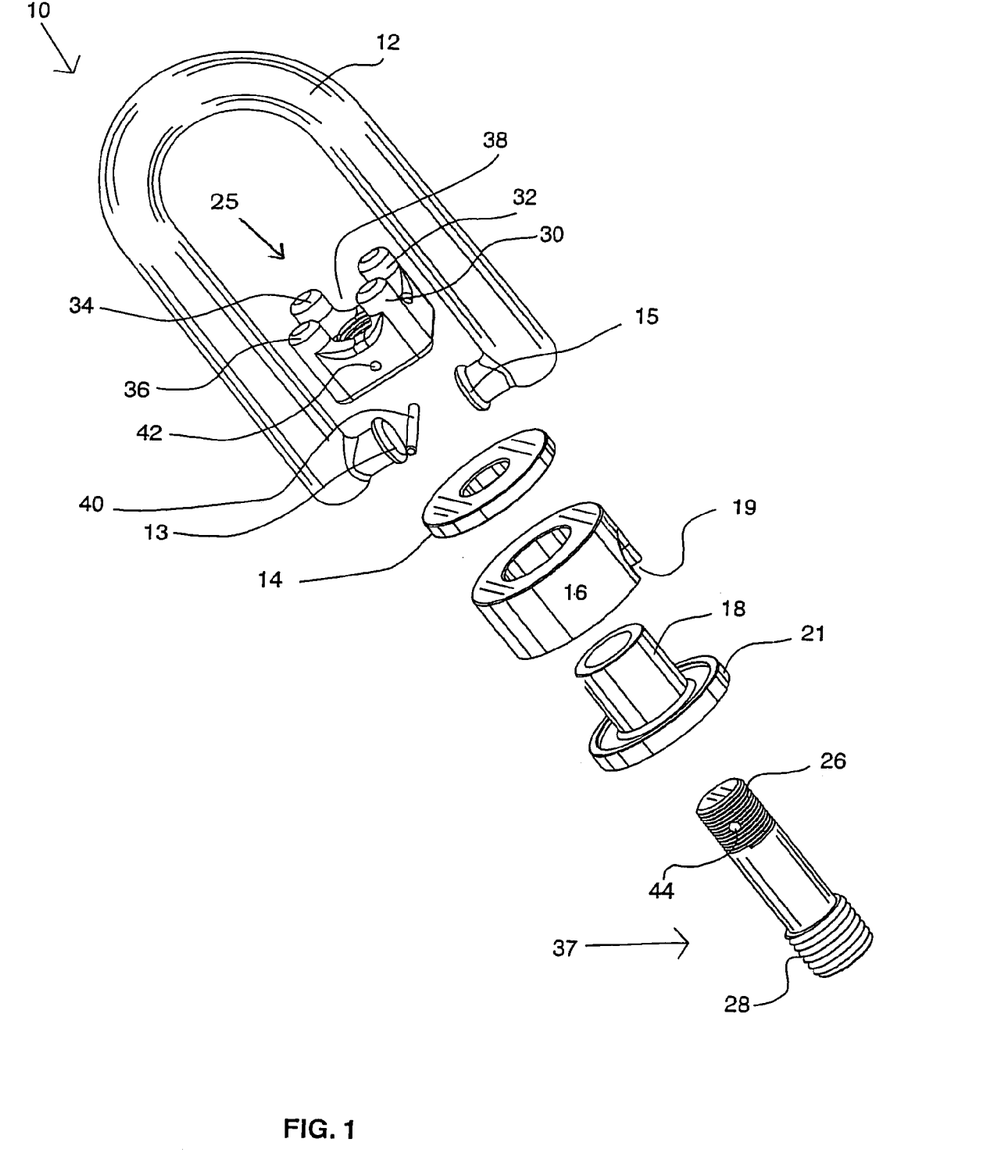
FIG. 1 is an exploded isometric view of a preferred embodiment of the invention illustrating a omni-positional lifting fixture including a bar knob pinned to the proximal end of a threaded mounting stud.

Referring now to the drawings wherein like reference numerals designate identical or corresponding parts throughout the several views, there is illustrated generally at 10 an omni-positional lifting fixture for threadable releasable assembly to a load or other substrate. In the embodiment chosen for illustration purposes, hoist ring assembly 10 includes a U-bar 12, the legs of which terminate in axially aligned stub shafts. The respective ends of the stub shafts are provided with enlarged ends 13 and 15. A load bearing washer 14 is positioned between a wrenchless torque accepting member in the form of bar nut 25 and bushing 18, and positioned to bear on the adjacent end of bushing 18 under the urging of bar nut 25. Washer 14 bears firmly against the adjacent end of bushing 18. The cylindrical body of bushing 18 is axially longer than the central bore of load ring or body 16. The central bore of body 16 surrounds the cylindrical body of bushing 18, and is generally concentric with the cylindrical body of bushing and the shank of a retainer element in the form of stud 37. The proximal end 28 of stud 37 is adapted to threadably engage a load, and the distal end 26 of stud 37 is adapted to threadably engage bar nut 25. Proximal end 28 is larger in diameter than distal end 26. Thus, body 16 is rotatably trapped between washer 18 and the radially extending flange 21 of bushing 18, but it is free to rotate about the longitudinal axis of the assembly. The enlarged ends 13 and 15 are trapped in cavities in body 16, of which 19 is typical, by the radially extending flange 21 of bushing 18, but are free to pivot about the common axis of the stub shafts to which the enlarged ends 13 and 15 are mounted. Thus, U-bar 12 is free to pivot and rotate through a hemisphere that is centered on the longitudinal axis of stud 37. The shank of stud 37 extends through the central bore of bushing 18, washer 14, and is threadably engaged by bar nut 25 to compressively hold the assembly together in an operative configuration when threadably engaged with a load. Because of the enlarged proximal end 28 of stud 37, bar nut 25 must be separable from stud 37 so as to permit the assembly of the omni-positional lifting fixture. Once the omni-positional lifting fixture is assembled together, bar nut 25 is preferably more or less permanently attached to distal end 26 by means of pin 40 driven through port 42 in bar nut 25, and matching port 44 in stud 37. This holds the lifting fixture in one assembly for shipping, handling and installation. Having an assembly from which nothing can be left out during installation promotes safety. The tongue which is applied to the bar nut 25 to tighten the lifting fixture to a load generally acts on the enlarged proximal end 28, and does not threadably tighten the bar nut 25 to the distal end 26. Load ring or body 16, U-bar 12, washer 14, stud 37, bar nut 25, and bushing 18 together define an omni-positional lifting fixture, which is generally concentric with the shank of stud 37, and upon which U-bar 12 is rotationally and pivotally mounted. The wrenchless torque accepting member and the retainer element are mounted to one another so that they do not rotate relative to one another. In this way, torque applied to the wrenchless torque accepting member is transmitted through the retainer element, and acts to tighten a threaded connection between the retainer element and a load or other substrate to which it is mounted.

Figure 2:
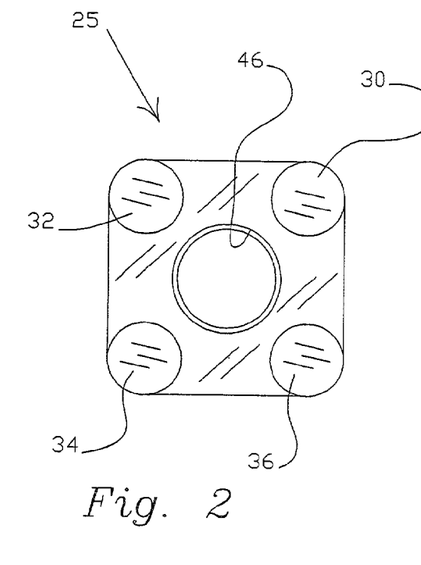
FIG. 2 is a plan view of the bar knob depicted in FIG. 1.
Figure 3:
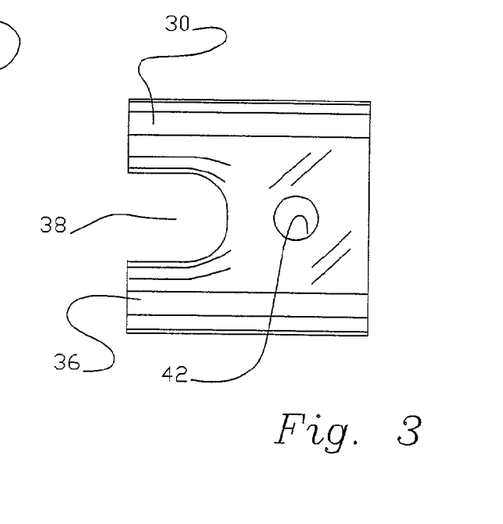
FIG. 3 is a side view of the bar knob depicted in FIG. 2.

Bar nut 25 is provided with spaced apart axially projecting lugs 30, 32, 34, and 36. Threaded bore 46 is adapted to threadably engage with distal end 26 of stud 37. Lugs 30 and 36, and 32 and 34 are spaced apart so as to provide a space 38. Space 38 is adapted to receive, for example, a simple bar that is positioned generally transversely of bore 46. Force applied to such a bar when so engaged causes the stud 37 to threadably rotate. The engagement of pin 40 in port 42 and matching port 44 causes stud 37 and bar nut 25 to rotate as a single unit. Proximal end 28 rotates threadably in an associated load or other substrate. The configuration of the lugs 30–36 thus serves as a wrenchless torque accepting member.

Figure 4:
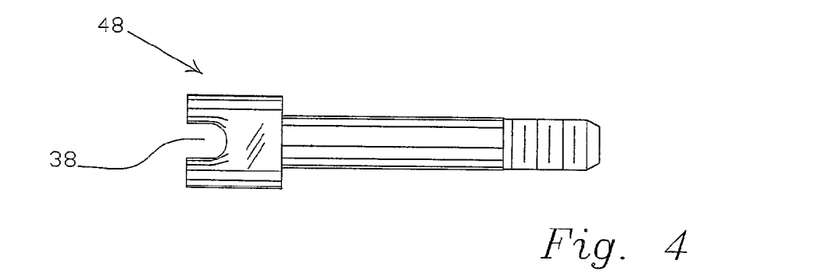
FIG. 4 is a side view of an embodiment of a mounting bolt wherein the head of the bolt is integral with the shank and includes a wrenchless torque application element.

The embodiment of FIG. 4 illustrates that the distal end of the stud or other retainer element 48 can be formed integral with the axially extending lugs rather than being formed separately and fastened thereto. The spacing of the lugs so as to provide bar receiving space 38 between them requires that the distal end of stud or retainer element 37 be enlarged. The proximal end of retainer element 37 must be small enough in diameter to allow passage through the bushing 18 and washer 14.

Figure 5:
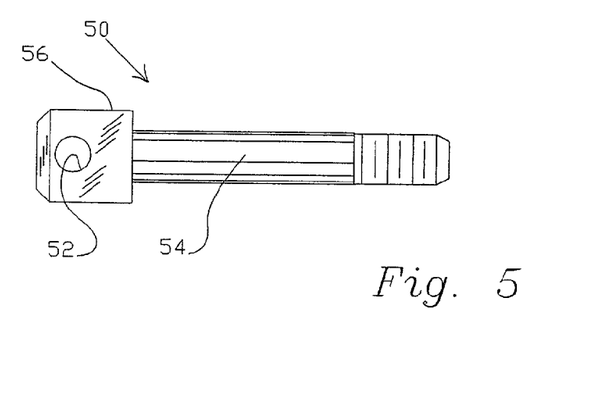
FIG. 5 is a side view of a further embodiment of a mounting bolt wherein the head of the bolt is integral with the shank and includes a wrenchless torque application element.
Figure 6:
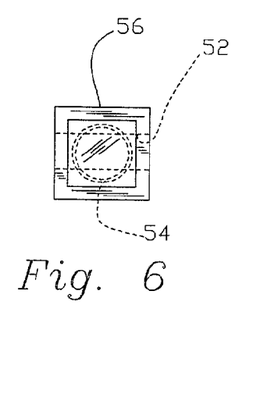
FIG. 6 is an end view of the embodiment of the mounting bolt depicted in FIG. 5.

The embodiment of FIG. 5 illustrates a configuration where a transverse bore 52 is provided in a solid head 56 integral with the distal end of retainer element 50. The application of force to a bar that is projected through transverse bore 52 causes integral shank 54 to rotate so that the proximal end of stud or retainer element 50 threadably engages a mating threaded bore in a load or other substrate. The square platform of the distal end of retainer element 50 permits the application of torsional force through a wrench, if desired. Other head forms such as hexagonal (see, for example, nut 27 in FIG. 11), socket, or the like can be employed with transverse bore 52.

Figure 9:
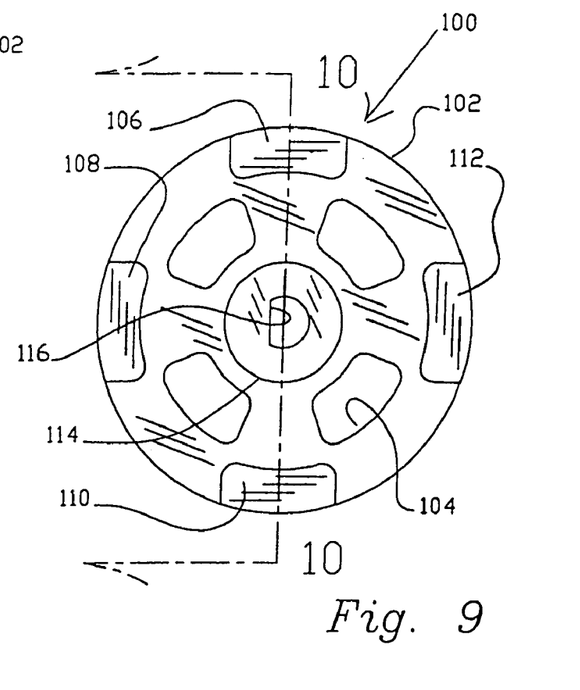
FIG. 9 is a plan view similar to FIG. 7 illustrating a further embodiment of a mounting collar wherein a raised boss is provided to space the U-bar above the axially projecting lugs.
Figure 10:
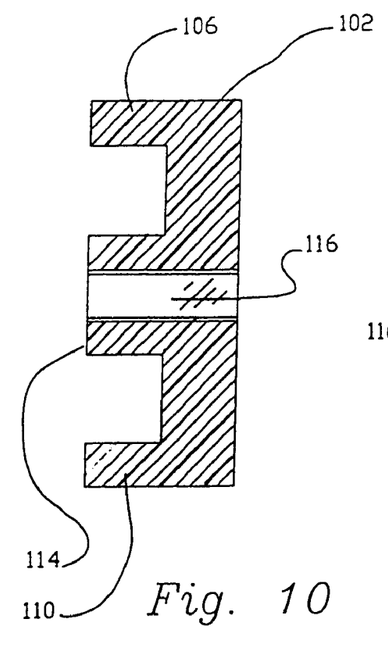
FIG. 10 is a cross-sectional view taken along section 10—10 in FIG. 9.
Figure 11:
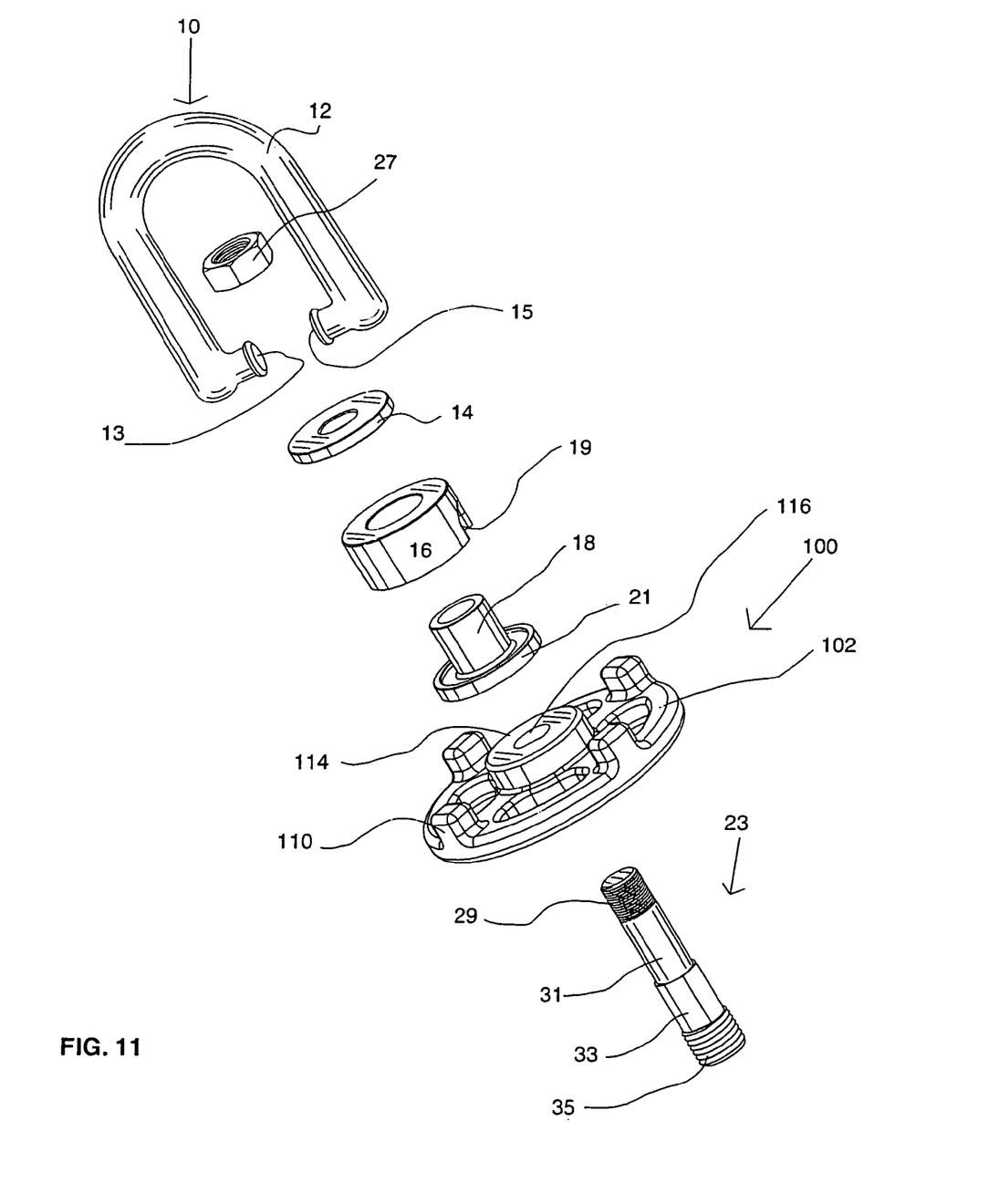
FIG. 11 is an exploded isometric view similar to FIG. 1 showing a collar of the embodiment of FIGS. 9 and 10 in operative position in an omni-positional lifting fixture.

FIGS. 7 through 11 are illustrative of those embodiments where the axially projecting lugs are provided on a radially enlarged collar that is keyed or otherwise mounted to a lifting fixture mounting stud. The axially extending lugs are positioned radially from the mounting stud so as to permit force to be applied to them by striking them with a hammer or other heavy object. In the particular embodiment illustrated in FIGS. 7 and 8, a wrenchless torque accepting member in the form of a collar 120 surrounds a retainer element, for example, in the form of stud 23 (FIG. 11). The wrenchless torque accepting member and the retainer element are mounted to one another so that they do not rotate relative to one another. In this way, torque applied to the wrenchless torque accepting member is transmitted through the retainer element, and acts to tighten or loosen a threaded connection between the retainer element and a load or other substrate to which it is mounted.

Figures 7, 8:
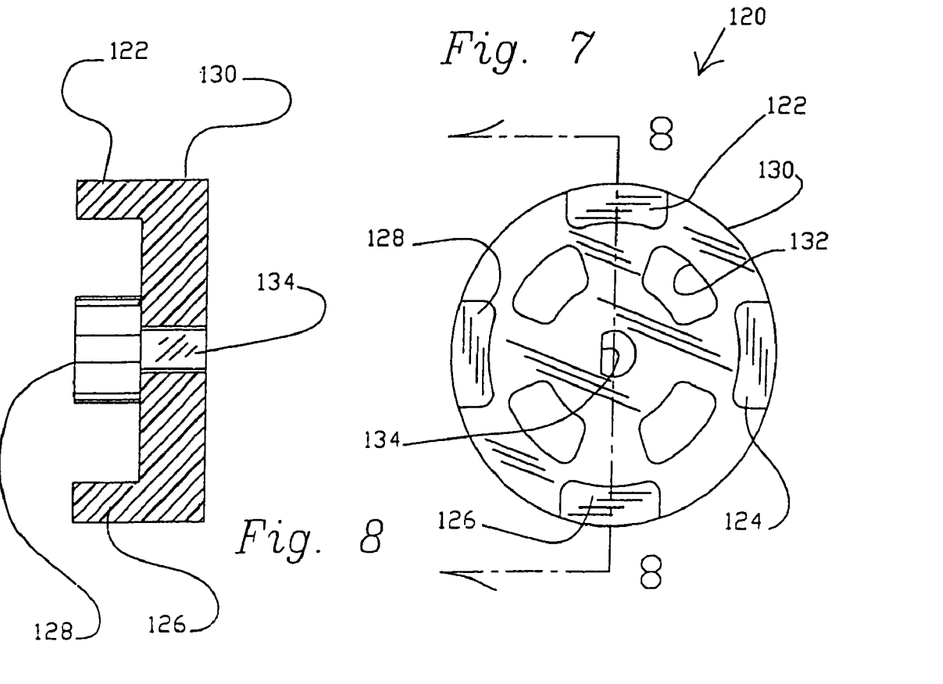
FIG. 7 is a plan view of a mounting collar with upturned lugs that is adapted to be mounted to the mounting stud shown, for example, in FIG. 11.
FIG. 8 is a cross-sectional view taken along section 8—8 in FIG. 7.

The wrenchless torque accepting member in the embodiment of FIGS. 7 and 8 is in the form of a circular plate 130 with an axial bore 134 and axially projecting lugs 122, 124, 126, and 128. Lugs 122, 124, 126, and 128 are spaced radially from, and project generally parallel to, the axial bore 134 in a position where they are visible and easily accessible to a hammer blow. Even when the lifting fixture is mounted to a trench plate that has been bent or covered with mud, the axially projecting lugs are accessible. The collar is conveniently non-rotatably fixed to a retainer member, for example, stud 23 (FIG. 11), by means of a key or flat 33, which engages with a corresponding flat in bore 134. The plate 130 need not be completely solid. For ease of transportation and handling plate 130 can be lightened by way of lightening holes, of which 132 is typical. Four lugs are illustrated. As will be understood by those skilled in the art, more or less than four lugs can be provided, as desired.

FIGS. 9 and 10 are illustrative of embodiments wherein a central boss is provided to elevate the lifting fixture above the lugs. In this way interference between the lugs and the U-bar 12 is avoided. A wrenchless torque accepting member 100 in the form of circular plate 102 is provided with an axial bore 116, which is adapted to non-rotatably mate with a retainer element in the form of stud 23 (FIG. 11), lightening holes, of which 104 is typical, and radially spaced axially extending lugs 106, 108, 110, and 112. Lugs 106–112 serve generally the same purposes as previously described with reference to lugs 122–128 (FIG. 7). An annular boss 114 surrounds axial bore 116 and projects axially therewith. For convenience of storage, transportation, and assembly, boss 114 is preferably, but not necessarily, integral with plate 102. Boss 114 serves to space a lifting fixture mounted thereto from interference with the axially extending lugs. If desired, the lifting fixture can be configured so that the U-bar is prevented from swinging or pivoting into engagement with the lugs, for example, by increasing the diameter of flange 21 (FIG. 11). Boss 114 can project axially less or more than the lugs as may be desired to achieve a particular spacing. Boss 114 precludes the lifting fixture from engaging the lugs even when a load is applied to the lifting fixture from a direction that is almost parallel to the surface of an attached trench plate.

Figure 12:
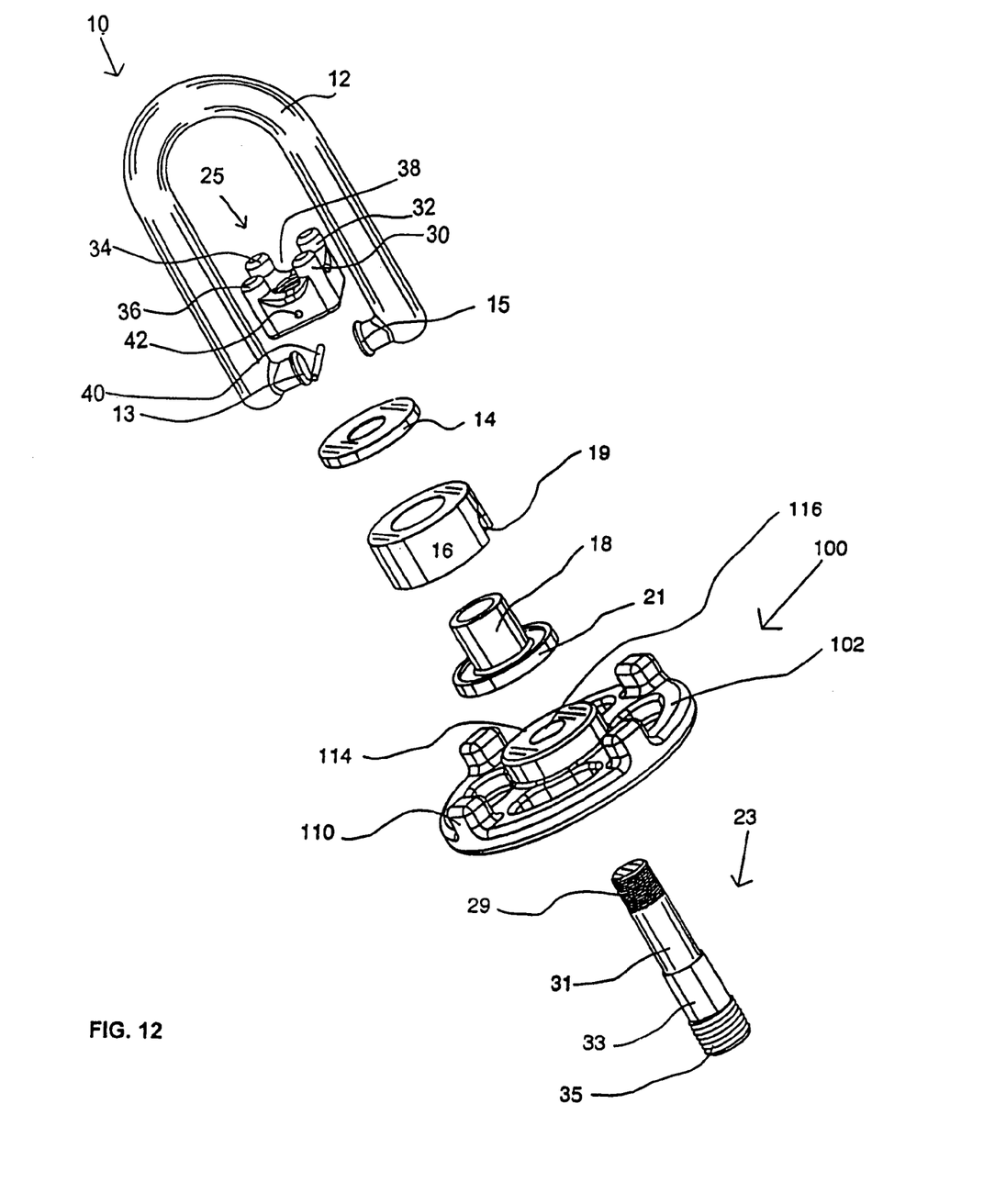
FIG. 12 is an exploded isometric view similar to FIG. 11 showing a bar nut similar to the embodiment of FIG. 1 and a collar similar to the embodiment of FIG. 11 in operative position in an omni-positional lifting fixture.

Lifting fixture 10, particularly as illustrated in FIG. 11, is similar in certain respects to FIG. 1. Stud 23 includes a proximal threaded end 35. Proximal end 35 is adapted to being threadably received in a threaded bore in a load. Distal end 29 of stud 23 is adapted to threadably engage nut 27. Shank 31 is proportioned so that proximal end 35 is larger than distal end 29. For purposes of illustration, nut 27 has been depicted as a conventional hex nut. As will be understood by those skilled in the art, bar nut 25, as depicted in FIGS. 1–3 could be used in place of nut 27, if desired. Such a configuration provides axially extending lugs that are accessible to either a bar or a hammer, thus extending the utility of the wrenchless torque accepting member to whatever torque applying member is handy at the moment. Such an embodiment is illustrated, for example, in FIG. 12 wherein the reference numbers indicate the same structure as described with respect to the previous illustrated embodiments, particularly FIGS. 1 and 11.

The wrenchless torquing provisions of the present invention are applicable to a wide variety of omni-positional lifting fixtures including for example, those disclosed in Tsui et al. U.S. Pat. No. 4,705,422, FIG. 3 of which is hereby incorporated herein by reference, Tsui et al. U.S. Pat. No. 5,848,815, FIG. 1 of which is hereby incorporated herein by reference, Tsui et al. U.S. Pat. No. 6,022,164, FIG. 1 of which is hereby incorporated herein by reference, and Alba U.S. Pat. No. 6,199,925, FIG. 2 of which is hereby incorporated herein by reference.

What have been described are preferred embodiments in which modifications and changes may be made without departing from the spirit and scope of the accompanying claims. Clearly, many modifications and variations of the present invention are possible in light of the above teachings. It is therefore to be understood that, within the scope of the appended claims, the invention may be practiced otherwise than as specifically described.

What is claimed is:

1. An omni-positional lifting fixture for wrenchiessly releasable assembly to a substrate, said omni-positional lifting fixture comprising:
   a shackle member pivotally attached to a rotationally mounted lift body; and
   a retainer element adapted to threadably attach said omni-positional lifting fixture to a substrate, said retainer element being torquably associated with a torque accepting member, said torque accepting member comprising axially extending lugs and said axially extending lugs being positioned to receive wrenchlessly applied torque from a bar positioned between and in direct contact with said axially extending lugs to threadably rotate said retainer element relative to said substrate, said rotationally mounted lift body being capable of swiveling substantially through 360 degrees without threadably rotating said retainer element relative to said substrate, said torque accepting member includes a transverse bore extending therethrough, and said retainer element includes a matching bore extending therethrough, said transverse and matching bores being adapted to receive therethrough a pin member, said pin member being adapted to secure said torque accepting member non-rotatably to said retainer element while said rotationally mounted lift body remains capable of swiveling substantially through 360 degrees without threadably rotating said retainer element relative to said substrate.

2. An omni-positional lifting fixture for wrenchlessly releasable assembly to a substrate, said omni-positional lifting fixture comprising:

a shackle member pivotally attached to a rotationally mounted lift; and a retainer element adapted to threadably attach said omni-positional lifting fixture to a substrate, said retainer element being torquably associated with a torque accepting member, said torque accepting member comprising axially extending lugs on a collar member, said collar member having a first side facing said shackel member and a second side opposed thereto, said lugs projecting generally axially away from said first side towards said shackel member, and said axially extending lugs being positioned to receive wrenchlessly applied torque from the impact of a hammer directly on said axially extending lugs to threadably rotate said retainer element relative to said substrate while said rotationally mounted lift body remains free to rotate in said omni-positional lifting fixture without rotating said retainer element relative to said substrate.

3. An omni-positional lifting fixture for wrenchiessly releasable assembly to a substrate, said omni-positional lifting fixture comprising:

a shackle member pivotally attached to a rotationally mounted lift body; and a retainer element adapted to threadably attach said omni-positional lifting fixture to a substrate, said retainer element being torquably associated with a torque accepting member, said torque accepting member comprising axially extending lugs on a collar member, said collar member including a first side adjacent said shackel member and a second side opposed to said first side, said collar member including spaced apart lug members projecting generally axially of said retainer element from said first side of said collar member towards said shackel members and said lug members being positioned to receiving wrenchlessly applied torque applied directly to said lug members by a hammer to threadably rotate said retainer element relative to said substrate while said rotationally mounted lift body remains free to rotate without threadably rotating said retainer element relative to said substrate.

4. An omni-positional lifting fixture for wrenchlessly releasable assembly to a substrate of claim 3 wherein said collar member includes a boss extending axially of said collar member from said first side, said boss being adapted to mount said omni-positional lifting fixture.

5. An omni-positional lifting fixture for wrenchlessly releasable assembly to a substrate of claim 4 wherein said boss is integral with said collar member.

6. An omni-positional lifting fixture for wrenchiessly releasable assembly to a substrate of claim 3 wherein said retainer element is integral with said collar member.

7. An omni-positional lifting fixture for wrenchiessly releasable assembly to a substrate, said omni-positional lifting fixture comprising:

a shackle member pivotally attached to a rotationally mounted lift body, and a retainer element adapted to threadably attach said omni-positional lifting fixture to a substrate, said retainer element being torquably associated with a torque accepting member, said torque accepting member comprising axially extending lug members on a collar member, or axially extending lug members on a bar nut, said collar member including spaced apart said lug members projecting generally axially of said retainer element and adapted to receiving wrenchiessly applied torque applied by a hammer, or said axially extending lug members on said bar nut being adapted to receiving wrenchlessly applied torque applied by a bar projected laterally therebetween.

* * * * *